(12) United States Patent
de los Reyes et al.

(10) Patent No.: US 9,774,634 B2
(45) Date of Patent: *Sep. 26, 2017

(54) END-TO-END SECURE CLOUD COMPUTING

(71) Applicant: AT&T Intellectual Property I, L.P., Atlanta, GA (US)

(72) Inventors: Gustavo de los Reyes, Fair Haven, NJ (US); William R. Beckett, Marlboro, NJ (US); Jerry Birkes, Altadena, CA (US); Deepak K. Chawla, Ocean, NJ (US); Joshua David Knight, Lawrenceville, GA (US); Sanjay Macwan, Marlboro, NJ (US); William O'Hern, Spring Lake, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,880

(22) Filed: May 12, 2016

(65) Prior Publication Data

US 2016/0261637 A1 Sep. 8, 2016

Related U.S. Application Data

(63) Continuation of application No. 14/508,663, filed on Oct. 7, 2014, now Pat. No. 9,392,023, which is a
(Continued)

(51) Int. Cl.
*H04L 29/06* (2006.01)
*H04L 12/24* (2006.01)
(Continued)

(52) U.S. Cl.
CPC .......... *H04L 63/20* (2013.01); *H04L 41/5003* (2013.01); *H04L 47/70* (2013.01);
(Continued)

(58) Field of Classification Search
CPC ..... H04L 63/20; H04L 41/5003; H04L 47/70; H04L 63/105; H04L 53/205; H04L 67/10;
(Continued)

(56) References Cited

U.S. PATENT DOCUMENTS 6,505,244 B1 1/2003 Natarajan et al.
6,678,835 B1 1/2004 Shah et al.
(Continued)

OTHER PUBLICATIONS

"AT&T Unveils Network-Based "On Demand" Computing for Companies of All Sizes," AT&T Newsroom, Dallas, Texas, Nov. 16, 2009; http://www.att.com/gen/press-room?pid=4800&cdvn=news &newsarticle.
(Continued)

*Primary Examiner* — Michael S McNally
(74) *Attorney, Agent, or Firm* — Akerman LLP; Michael K. Dixon; Mammen (Roy) P. Zachariah, Jr.

(57) ABSTRACT

A method includes receiving, at a control node of a cloud computing network, a first enterprise policy specific to the first enterprise and a second enterprise policy specific to the second enterprise, and managing communications between at least one user device of the first enterprise and the at least one enterprise application hosted on behalf of the first enterprise based on the first enterprise policy. The method also includes managing communications between at least one user device of the second enterprise and the at least one enterprise application hosted on behalf of the second enterprise based on the second enterprise policy.

20 Claims, 4 Drawing Sheets

Related U.S. Application Data continuation of application No. 12/782,578, filed on May 18, 2010, now Pat. No. 8,856,300.

(51) Int. Cl.
*H04L 12/911* (2013.01)
*H04L 29/08* (2006.01)

(52) U.S. Cl.
CPC .......... *H04L 63/105* (2013.01); *H04L 63/205* (2013.01); *H04L 67/10* (2013.01); *H04L 67/42* (2013.01); *H04L 63/04* (2013.01); *H04L 63/08* (2013.01); *H04L 63/10* (2013.01)

(58) Field of Classification Search
CPC ......... H04L 67/42; H04L 63/04; H04L 63/08; H04L 63/10
USPC .......................................................... 726/1
See application file for complete search history.

(56) References Cited

U.S. PATENT DOCUMENTS

| | | | |
|---|---|---|---|
| 7,013,332 B2 | 3/2006 | Friedel et al. | |
| 7,318,237 B2 | 1/2008 | Moriconi et al. | |
| 7,526,541 B2 | 4/2009 | Roese et al. | |
| 7,551,627 B2 | 6/2009 | Scholl | |
| 8,010,085 B2 | 8/2011 | Apte et al. | |
| 8,112,379 B2 | 2/2012 | Voskuil et al. | |
| 8,141,143 B2 | 3/2012 | Lee | |
| 8,170,902 B2 | 5/2012 | Kennis et al. | |
| 8,635,672 B2 * | 1/2014 | Yamada | G06F 21/79 726/4 |
| 9,171,172 B2 * | 10/2015 | Goldschlag | G06F 21/60 |
| 2005/0022012 A1 | 1/2005 | Bluestone et al. | |
| 2005/0267954 A1 | 12/2005 | Lewis et al. | |
| 2007/0157203 A1 | 7/2007 | Lim | |
| 2007/0223408 A1 | 9/2007 | Thielke et al. | |
| 2007/0268824 A1 * | 11/2007 | Kodaka | H04L 12/24 370/229 |
| 2008/0086564 A1 | 4/2008 | Putman et al. | |
| 2008/0109871 A1 | 5/2008 | Jacobs | |
| 2008/0310633 A1 | 12/2008 | Brown et al. | |
| 2010/0058476 A1 * | 3/2010 | Isoda | G06F 21/6227 726/26 |
| 2010/0125903 A1 | 5/2010 | Devarajan et al. | |
| 2011/0022642 A1 * | 1/2011 | deMilo | G06F 17/30082 707/805 |
| 2011/0126197 A1 | 5/2011 | Larsen et al. | |
| 2011/0265164 A1 * | 10/2011 | Lucovsky | G06F 9/45533 726/7 |
| 2011/0265168 A1 * | 10/2011 | Lucovsky | H04L 63/0245 726/7 |
| 2011/0289134 A1 | 11/2011 | de los Reyes et al. | |
| 2011/0302623 A1 | 12/2011 | Ricci | |
| 2012/0084184 A1 | 4/2012 | Raleigh et al. | |
| 2012/0185913 A1 * | 7/2012 | Martinez | G06F 9/455 726/1 |
| 2013/0219211 A1 * | 8/2013 | Gopinath | G06F 11/1482 714/3 |
| 2014/0032759 A1 | 1/2014 | Barton et al. | |

OTHER PUBLICATIONS

"AT&T to Deliver Cloud-Based "Storage as a Service" Offer to Enterprise Customers," AT&T Newsroom, Dallas, Texas, Nov. 18, 2009, http://www.att.com/gen/press-room?pid=4800&cdvn=news &newsarticle.

"AT&T Synaptic Computer As a Service," AT&T Intellectual Property, 2010, AT&T 36USC220506, https://www.synaptic.att.com/caas.

AT&T Synaptic Storage As a Service, AT&T Intellectual Property, 2010, AT&T 36USC220506, https://www.synaptic.att.com/staas.

U.S. Appl. No. 12/610,746, filed Nov. 2009.

* cited by examiner

END-TO-END SECURE CLOUD COMPUTING

CROSS REFERENCE TO RELATED APPLICATIONS

This application claims priority to and is a continuation of U.S. patent application Ser. No. 14/508,663, filed Oct. 7, 2014, which is a continuation of and claims the priority to U.S. patent application Ser. No. 12/782,578, filed May 18, 2010, now U.S. Pat. No. 8,856,300 which are both hereby incorporated by reference in their entireties.

FIELD OF THE DISCLOSURE

The present disclosure relates generally to networking and relates more particularly to cloud computing.

BACKGROUND

Cloud computing increasingly is implemented as an alternative to conventional client-server computing environments. In cloud computing, hardware and software resources are supplied to remote computing devices on-demand. In a conventional cloud computing environment, the resources of the "cloud" are shared among multiple users. This approach typically provides reduced costs and oversight on a per-user basis as each user is no longer required to acquire, configure, and manage a separate computing infrastructure.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
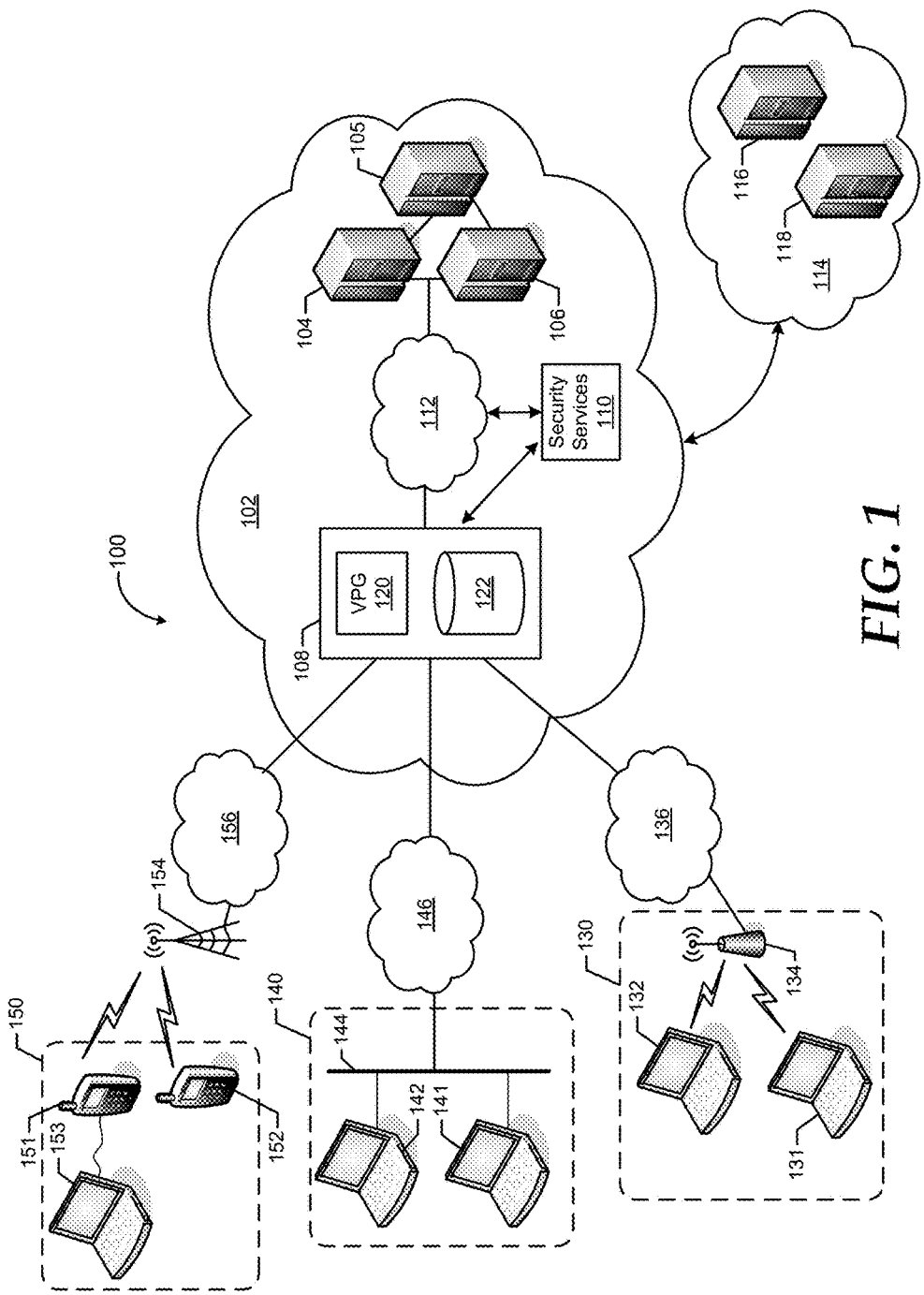
FIG. 1 is a diagram illustrating a networked system employing secure end-to-end cloud computing for a plurality of enterprises in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-4 illustrate techniques for providing end-to-end secure cloud computing in a networked system. In at least one embodiment, a service provider manages or otherwise provides a cloud computing network including or having access to one or more servers, data storage components, and other resources. Software applications employed by an enterprise, referred to herein as "enterprise applications," are hosted at the cloud computing network. The enterprise accordingly employs thin client devices or other user devices configured to provide graphical user interfaces (GUIs) to facilitate users' interactions with the executed enterprise applications, such as by receiving user input via keyboards, mice, and touch screens, and by displaying graphical representations of information provided by the executed enterprise applications. To provide improved security and simplified management, the network access and security policies of an enterprise are implemented at the cloud computing network rather than within the local computing infrastructure of the enterprise. Accordingly, the enterprise determines an enterprise policy to be employed by the cloud computing network specifically with respect to communications between the enterprise applications hosted in the cloud computing network and the corresponding end-point devices associated with the enterprise. The enterprise provides this enterprise policy to the service provider, which then implements the enterprise policy within the cloud computing network so as to manage communications between the end-point devices and the hosted enterprise applications.

By migrating both the applications of an enterprise and responsibility for implementing the access and security policies of the enterprise to the cloud computing network, the enterprise can achieve the desired computing services in a more cost-effective, secure, and simplified manner. For one, fully-functional, stand-alone endpoint user devices, such as conventional notebook computers and desktop computers, are expensive to acquire and to maintain. The techniques described herein enable an enterprise to replace these more costly fully-functional user devices with less costly and simpler thin client devices that typically provide resources sufficient only to enable the capture and transmission of user input to a remote application and the display of graphics information from the remote application. The replacement of fully-functional user devices with thin client devices also enhances security. The thin client devices can be configured so as to prevent the persistent storage of potentially confidential data, thereby mitigating the risk of data loss or data theft. Moreover, the thin client devices can be configured so as to only support the thin client application, thereby circumventing users' attempts to use unauthorized software at the user device or to use authorized software in an unauthorized manner, as well as mitigating the risk of infection by a virus or other malware.

An enterprise utilizing a conventional client-server system typically is required to employ complex local area network (LAN) routing, LAN security, and demilitarized zone (DMZ) security to connect and protect enterprise assets, as well as providing extensive data center security to protect physical access to enterprise data and assets. In contrast, the implementation of enterprise policies at the cloud computing network instead of within the enterprise infrastructure itself enhances security and simplifies management by shifting management of the enterprise-specified security and access policies, physical access control, and infrastructure configuration, maintenance, and management to a third-party service provider managing the cloud computing network.

FIG. 1 illustrates a networked system 100 employing end-to-end secure cloud computing in accordance with at least one embodiment of the present disclosure. The system 100 includes a cloud computing network 102 managed by a third-party service provider. The cloud computing network 102 includes a shared computing infrastructure, such as one or more data centers, such as data centers 104, 105, and 106. The cloud computing network 102 further includes a secure network control node 108 and one or more security services nodes 110 that are coupled to the data centers via one or more secure networks 112 internal to the cloud computing network 102. Examples of the secure network 112 can include an internet protocol multimedia subsystem (IMS)-based network or a multiprotocol label switching (MPLS)-based network.

The data centers 104-106 each includes computing resources that facilitate the hosting of enterprise data and enterprise applications in the cloud computing network 102 on behalf of one or more enterprises. These resources include data storage components, such as disk drives or nonvolatile memory, to store the enterprise applications and the data. These resources further include server computers to execute the enterprise applications and to access and store data to the data storage components accordingly. In one embodiment, the resources of the data centers are virtually shared computing resources, such as those shared on-demand between multiple enterprises. In this instance, the data centers can implement server virtualization whereby a server computer may be simultaneously shared between multiple enterprises using the appropriate virtualization masking protocols to prevent access between applications executed by one enterprise and applications executed by another enterprise on the same server. Alternatively, certain enterprises may have a service level agreement (SLA) or other arrangement with the service provider whereby certain resources of one or more of the data centers 104-106 are dedicated solely for use by the corresponding enterprise.

The secure network control node 108, in one embodiment, manages communications between end-point devices of the enterprises and the computing resources of the cloud computing network 102 that support the enterprises. As such, the secure network control node 108 operates as the gateway interface between external enterprise user devices and the data centers 104-106. Further, the cloud computing network 102 may make use of resources in a public network 114 in supporting one or more enterprises. To illustrate, the cloud computing network 102 may interface with various Internet-based servers, such as web server 116 or content server 118, which execute enterprise applications or otherwise provide, store, or manipulate data on behalf of the enterprises. In these instances, the secure network control node 108 also operates as the gateway interface between external enterprise user devices and the public network 114.

The secure network control node 108 facilitates simplification and cost-reduction in managing enterprise computing resources by employing the network access and security policies of an enterprise (hereinafter, the "enterprise policy") within the cloud computing network 102, rather than within the local infrastructure of the corresponding enterprise. To this end, the secure network control node 108 includes a virtual private gateway (VPG) device 120 and a policy database 122 or other data storage component. The policy database 122 stores data representative of the enterprise policies of the enterprises supported by cloud computing network 102 and the VPG device 120 manages ingress and egress communications between the enterprise end-point devices, the data centers 104-106, and the one or more public networks 114 in accordance with the access and security policies outlined in the stored enterprise policies. As different enterprises have different access control and security needs, the secure network control node 108 employs separate enterprise policies for the supported enterprises, each enterprise policy specific to the corresponding enterprise and configured in accordance with the specifications and parameters supplied by the enterprise.

As described in greater detail below with reference to FIG. 3, the VPG device 120 provides various functionality for securing communications through traffic encryption/decryption and virtual private network (VPN) techniques, for access control/authentication of enterprise users/user devices, for packet-filtering and application-level filtering, network address translation, traffic routing, and the like. Certain of these functions may be implemented, in whole or in part, through the use of the one or more security services nodes 110 configured accordingly by the VPG device 120. To illustrate, the cloud computing network 102 may provide hypertext transfer protocol (HTTP) proxying for an enterprise's access of internet resources, and the security services node 110 may configure or manage the appropriate security settings for the proxy server employed for the proxying.

By implementing an enterprise's access and security policies within the shared infrastructure of the cloud computing network 102, the enterprise is no longer required to acquire and maintain a relatively expensive and complex computing, networking, and security infrastructure. The computing infrastructure is replaced by equivalent shared infrastructure in the cloud computing environment. The enterprise's networking infrastructure thus can be simplified because its functionality is now reduced to routing traffic between the cloud computing infrastructure and the end devices. The security infrastructure likewise is simplified because it is largely implemented within the shared infrastructure of the cloud computing network rather than on the enterprise's premises.

Fully-functional stand-alone user devices, which otherwise would be necessary to implement an enterprise's computing infrastructure, instead can be replaced with relatively inexpensive and simple thin client devices with an operating system or platform kernel of limited functionality, such as one that is intended solely to support the capture and transmission of user input to a remote location and the corresponding display of graphical information from the remote location. As a data loss prevention measure, one or more of the thin client devices of an enterprise can be configured so as to prevent continued storage of data associated with an enterprise application beyond the corresponding period of interaction between the thin client device and the enterprise application. Further, as a security measure, one or more of the thin client devices of an enterprise can be configured so as to prevent the installation and execution of non-authorized software, thereby mitigating the risk of unauthorized access to enterprise data or applications through malicious software executed at a user device.

FIG. 1 depicts three examples of enterprises supported by shared computing resources of the cloud computing network 102. In the first example scenario, an enterprise 130 employs user devices 131 and 132 and a wireless access point 134. The wireless access point 134 is connected to the cloud computing network 102 via a network connection 136. The network connection can include, for example, a digital subscriber line (DSL) connection, a satellite connection, a mobile data connection, and the like. In this example, the user devices 131 and 132 are virtual workstations employed as thin client devices configured with a remote desktop protocol (RDP) agent so as to establish, via the secure network control node 108, a remote desktop session with one or more enterprise applications hosted by the cloud computing network 102.

In the second example scenario, an enterprise 140 employs user devices 141 and 142 and a wired local area network (LAN) 144. The LAN 144 in turn is connected to the cloud computing network 102 via a network connection 146. The user devices 141 can include, for example, a thin client device and a fully-functional notebook computer, respectively, each employing a Citrix XenApp™ client application that establishes a remote desktop services (RDS) session with one or more enterprise applications hosted by the cloud computing network 102 on behalf of the enterprise 140.

In the third example scenario, an enterprise 150 employs mobile devices 151 and 152, which can include, for example, computing-enabled cellular phones, networked personal digital assistants, networked tablet computers, and the like. The mobile user devices 151 and 152 are connected to the cloud computing network 102 via a base station transceiver (BTS) 154 and a mobile telecommunications link 156. The mobile devices 151 and 152 can employ any of a variety of means of establishing connections with one or more enterprise applications executed at the cloud computing network 102 on behalf of the enterprise 150. To illustrate, the mobile devices 151 and 152 can execute an RDP-based client application to establish an RDS session with an executed enterprise application. Alternatively, the mobile devices 151 and 152 can employ a web browser or other user interface or local application to access data and processing functionality provided by the cloud computing network 102 on behalf of the enterprise 150.

The enterprise 150 further can include a user device 153, such as a thin client device, tethered to the mobile device 151 via, for example, a wired connection (such as a Universal Serial Bus connection) or a short-range wireless connection (such as a Bluetooth wireless connection). In this configuration, the mobile device 151 is configured to act as a wireless modem or other conduit for communications to and from the user device 153 and thus the user device 153 uses the connectivity of the mobile device 151 to interact with one or more enterprise applications hosted by the cloud computing network 102 on behalf of the enterprise 150.

The enterprise policy to be implemented by the secure network control node 108 for an enterprise may depend on the user devices associated with the enterprise. To illustrate, the policies for fixed endpoints typically are different than mobile endpoints. It often is not practicable to implement a virtual private network (VPN) agent at mobile devices such as mobile phones, and thus communications between the mobile device and the Internet often are not protected from snooping. However, as illustrated by the third example scenario, the thin client device 153 can establish a secured connection with the cloud computing network 102 using a VPN or an encryption technique, and the mobile device 151 can be configured merely as the conduit for communications between the thin client device 153 and the cloud computing network 102.

Figure 2:
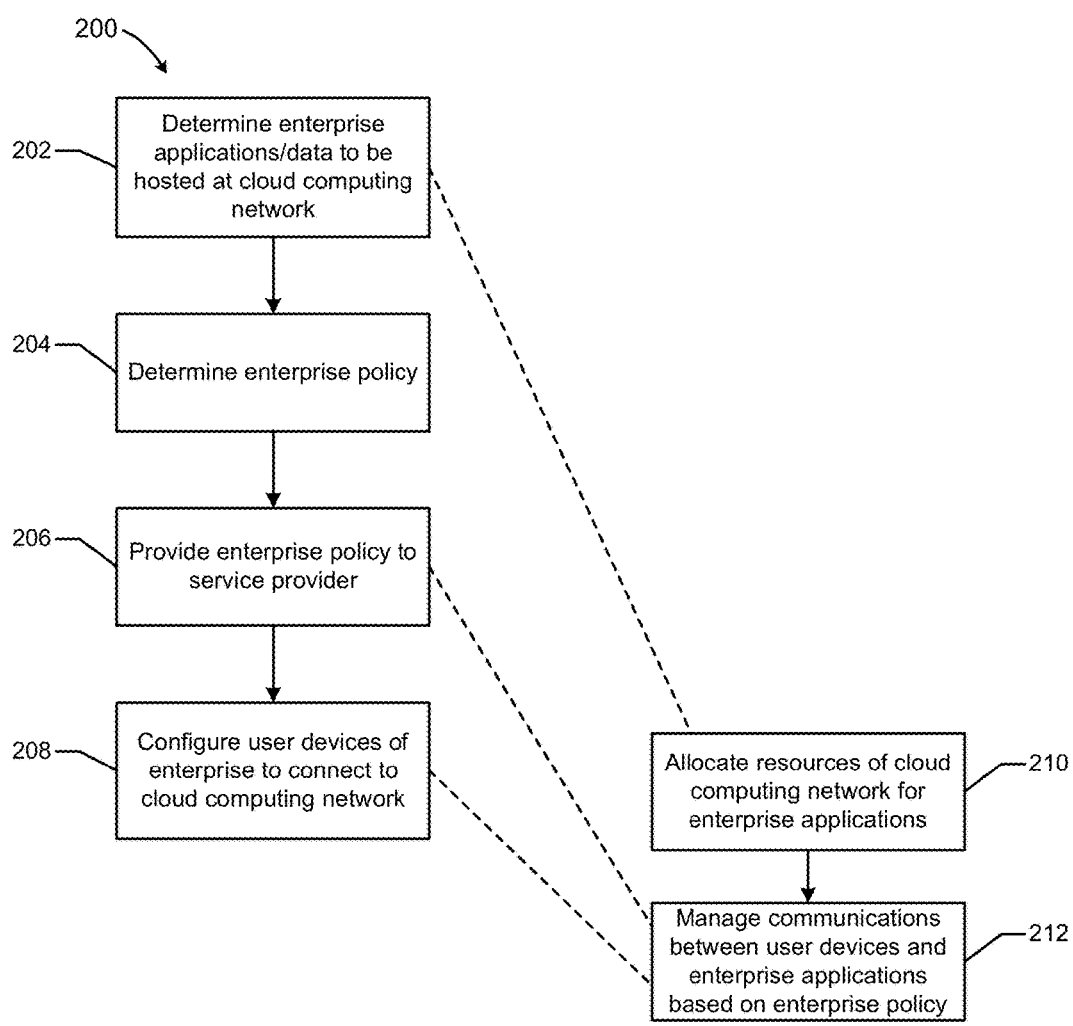
FIG. 2 is a flow diagram illustrating a method for utilizing enterprise-specific access and security policies at a cloud computing network of the networked system of FIG. 1, in accordance with at least one embodiment of the present disclosure.

FIG. 2 illustrates an example method 200 for providing secure, efficient, and cost-effective cloud computing services to an enterprise via implementation of the policies of the enterprise at the cloud computing network rather than within the enterprise's local infrastructure. For ease of discussion, the method 200 is described in the context of the networked system 100 of FIG. 1. Further, FIG. 2 illustrates the depicted blocks in a certain order for descriptive purposes and this order is not necessarily indicative of an order in which the processes represented by the depicted blocks are performed.

At block 202, an enterprise identifies one or more enterprise applications to be hosted by the cloud computing network 102. The enterprise further identifies enterprise data to be stored at the cloud computing network 102. The enterprise coordinates the installation or migration of the identified enterprise applications and enterprise data to one or more of the data centers 104-106 of the cloud computing network 102.

At block 204, the enterprise identifies the enterprise policy representing the enterprise's intended access and security policies with respect to access to, and operation of, the enterprise applications and enterprise data identified at block 202. The enterprise policy can include, for example, security services information. The security services information can identify protocols and other configuration information for authenticating or authorizing a user or user device, limits on access to certain data or certain enterprise applications (or certain functions of certain enterprise) by a user or user devices, limits on access to uniform resource locators (URLs) or other public network destinations reachable by a user or user device, packet filtering criteria, email filtering criteria, and distributed denial of service (DDoS) detection and prevention criteria. The enterprise policy further can include, for example, enterprise-specific network address translation (NAT), enterprise-specific traffic rerouting or proxying, traffic encryption/decryption, and the like.

At block 206, the enterprise supplies information or data representative of the determined enterprise policy to the service provider managing or otherwise responsible for the cloud computing network 102. This information or data can be input into the policy database 122 directly by an operators associated with the enterprise via, for example, a GUI provided by the secure network control node 108. Alternatively, the operator can submit this information to the service provider, and another operator associated with the service provider then may enter the policy information in the appropriate format into the policy database 122.

At block 208, the enterprise provides user devices and configures the user devices to communicate with the cloud computing network 102 for operation of, or interaction with, the enterprise applications hosted at the cloud computing network 102 and for access to enterprise data stored at the cloud computing network 102. This configuration process can include installation of a RDP client or other thin client agent at the user device. As another example, the configuration process can include configuring proxy information for a web browser or other GUI application implemented at the user device.

Turning to the operations of the cloud computing network 102, at block 210 the service provider allocates resources of the cloud computing network 102 for hosting the enterprise applications and for storing the enterprise data identified at block 202. The identification and allocation of resources may be made subject to a service level agreement or other arrangement between the service provider and the enterprise. As noted above, the cloud computing network 102 may provide resources in an on-demand basis, and thus the cloud computing network 102 may dynamically allocate resources for hosting enterprise applications based on the current requirements of the user devices of the enterprise.

As part of the hosting process, the VPG device 108 and one or more security services nodes 110 of the cloud computing network 102 manage communications between the user devices of the enterprise and the hosted enterprise applications based on the enterprise policy determined at block 204. The management of these communications can include, for example, enterprise-specific security services, such as packet filtering, email filtering, application-level filtering, URL or port filtering, network address translation, and the like. The management of the communications further can include higher-level access and security functions, such as user/device authentication, identification-based access level control, DDoS detection and mitigation, traffic rerouting, traffic encryption/decryption, and the like.

In at least one embodiment, the service provider utilizes the cloud computing network 102 to host enterprise applications and enterprise data for a plurality of enterprises. In such instances, the processes of blocks 202, 204, 206, 208, 210, and 212 can be separately performed for each enterprise and utilizing access and security policies specific to the parameters specified by the enterprise.

Figure 3:
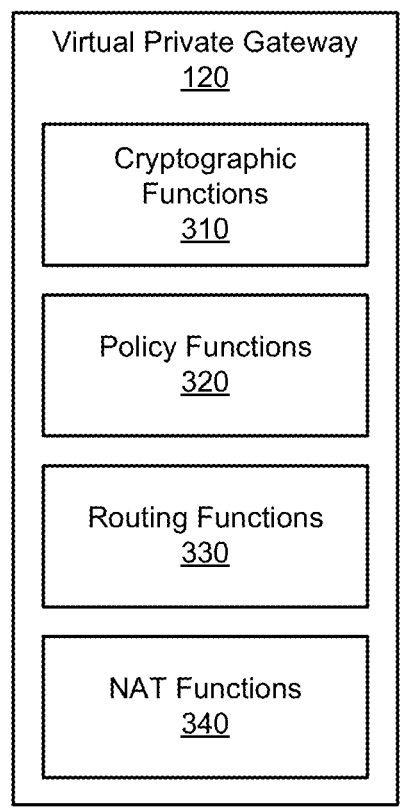
FIG. 3 is a block diagram illustrating functional components of a virtual private gateway (VPG) device of the networked system of FIG. 1 in accordance with at least one embodiment of the present disclosure.

FIG. 3 depicts a functional block diagram that illustrates an implementation of the VPG device 120 of FIG. 1 in accordance with at least one embodiment. The VPG device 120 comprises a cryptographic functions module 310, a policy functions module 320, a routing functions module 330, and a NAT functions module 340. The cryptographic functions module 310 is operable to provide an interface between the security techniques and parameters associated with corresponding user devices and the security techniques and parameters associated with secured networks of the cloud computing network 102. For example, the cryptographic functions module 310 may effectively translate between an encryption system used by a RDP client of a user device and an encryption system used by an internal secure network. The policy functions module 320 is operable to apply one or more of the access policies or security policies of the corresponding enterprise policy to the communication traffic received from, or provided to, user devices. The traffic policies may be associated with an internal secure network and the VPG device 120 may relieve the secure network of the need to enforce such policies. The routing functions module 330 is operable to route traffic in and out of a core network of the cloud computing network 102 in accordance with the specified enterprise policy. In one embodiment, the routing functions module 330 is configured to determine if communication traffic from the user devices is destined for a system/network outside of the secure network, such as the Internet at large. In this case, the routing functions module 130 may route such traffic to its final destination without passing through the secure network in accordance with the enterprise policy, thus relieving the secure network of the processing burden of redirecting the traffic to its intended destination. The NAT functions module 340 is operable to modify address information in packet headers in accordance with the enterprise policy so as to be able to remap from one address space to another. Further details regarding the VPG device 120 are found in co-pending U.S. patent application Ser. No. 12/610,746 entitled "Methods, Systems, and Computer Program Products for Providing a Virtual Private Gateway Between User Devices and Various Networks," the entirety of which hereby is incorporated by reference.

Figure 4:
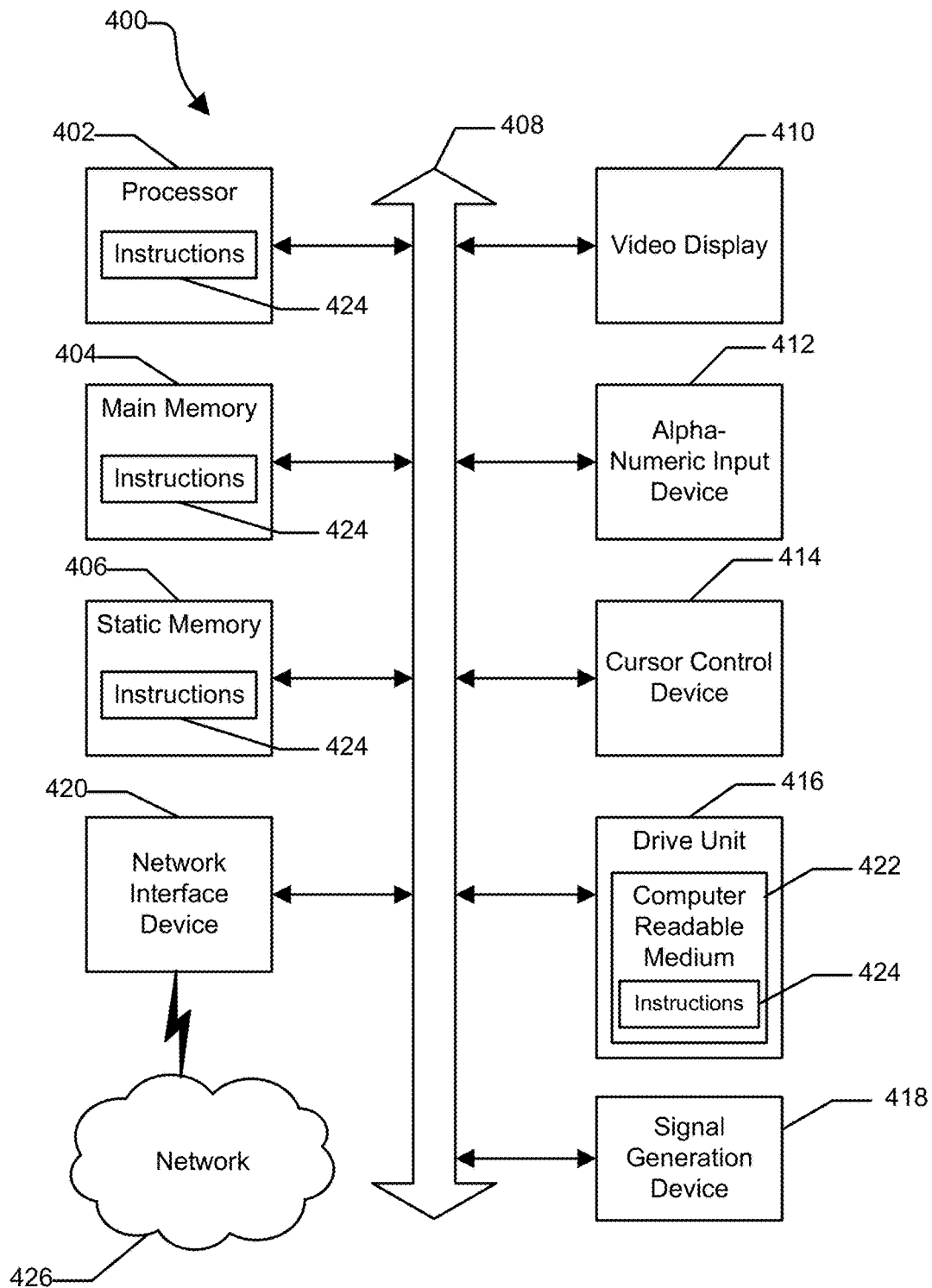
FIG. 4 is a diagram illustrating an example computer system for implementing one or more of the components or techniques described herein in accordance with at least one embodiment of the present disclosure.

FIG. 4 shows an illustrative embodiment of a general computer system 400 in accordance with at least one embodiment of the present disclosure. The computer system 400 can include a set of instructions that can be executed to cause the computer system 400 to perform any one or more of the methods or computer-based functions disclosed herein. To illustrate, the computer system 400 can represent an implementation of a user device associated with an enterprise, an implementation of the secure network control node 108, an implementation of the VPG device 120, or a server computer of one of the data centers 104-106. While a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse, joystick, or arrow pads. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Accordingly, the present disclosure contemplates a computer-readable medium that includes instructions to perform one or more of the operations described above. In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a memory that stores instructions; and
   hardware that executes the instructions to perform operations, the operations comprising:
      enforcing an enterprise policy of an enterprise so as to manage a communication between a thin client device of the enterprise and an enterprise application hosted by a network on behalf of the enterprise; and
      configuring the thin client device to prevent storage of data associated with the enterprise application beyond a period of interaction between the thin client device and the enterprise application.

2. The system of claim 1, wherein the operations further comprise identifying the enterprise policy of the enterprise.

3. The system of claim 1, wherein the operations further comprise providing the enterprise policy to a service provider that manages the network.

4. The system of claim 1, wherein the operations further comprise identifying the enterprise application hosted by the network on behalf of the enterprise.

5. The system of claim 1, wherein the operations further comprise configuring the thin client device to prevent installation and execution of non-authorized software.

6. The system of claim 1, wherein the operations further comprise allocating resources of the network for hosting the enterprise application.

7. The system of claim 6, wherein the operations further comprise allocating the resources based on a requirement of the thin client device.

8. The system of claim 1, wherein the operations further comprise enabling the thin client device to utilize a wireless connection of a mobile device communicatively linked to the thin client device.

9. The system of claim 1, wherein the operations further comprise identifying enterprise data of the enterprise to be stored on the network.

10. The system of claim 1, wherein the operations further comprise installing a remote desktop protocol client at a user device associated with the thin client device.

11. The system of claim 1, wherein the operations further comprise configuring proxy information for a web browser implemented at a user device associated with the thin client device.

12. The system of claim 1, wherein the operations further comprise translating between a first encryption system utilized by a client system utilized by a user device associated with the thin client device and a second encryption system utilized by an internal secure network.

13. The system of claim 1, wherein the operations further comprise routing traffic in and out of the network in accordance with the enterprise policy.

14. A method, comprising:
   managing, by enforcing an enterprise policy of an enterprise, a communication between a thin client device of the enterprise and an enterprise application hosted by a network on behalf of the enterprise; and
   configuring, by utilizing instructions from a memory that are executed by a processor, the thin client device to prevent storage of data associated with the enterprise application beyond a period of interaction between the thin client device and the enterprise application.

15. The method of claim 14, further comprising modifying, based on the enterprise policy, a packet header for traffic coming from a user device associated with the thin client device.

16. The method of claim 14, further comprising enabling the thin client device to utilize a wireless connection of a mobile device communicatively linked to the thin client device.

17. The method of claim 14, further comprising tethering the thin client device to a user device via a wired connection.

18. The method of claim 14, further comprising creating the enterprise policy.

19. The method of claim 14, further comprising selecting a user device to operate as a conduit for the communication between the thin client device and the enterprise application.

20. A non-transitory computer-readable device comprising instructions, which, when loaded and executed by a processor, cause the processor to perform operations, the operations comprising:
  generating an enterprise policy of an enterprise for managing a communication between a thin client device of the enterprise and an enterprise application hosted by a network on behalf of the enterprise; and
  configuring the thin client device to prevent storage of data associated with the enterprise application beyond a period of interaction between the thin client device and the enterprise application.

* * * * *